Nov. 6, 1962  A. KEEFE  3,062,254
MOLDED WHEEL HAVING INTERNAL REINFORCING
Filed Oct. 20, 1959
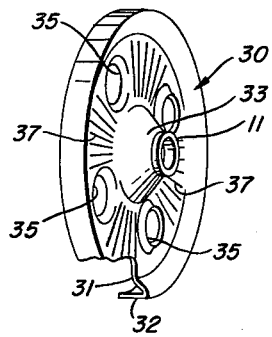
FIG. 2
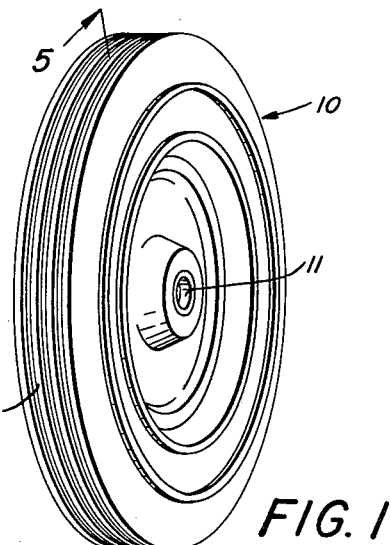
FIG. 1
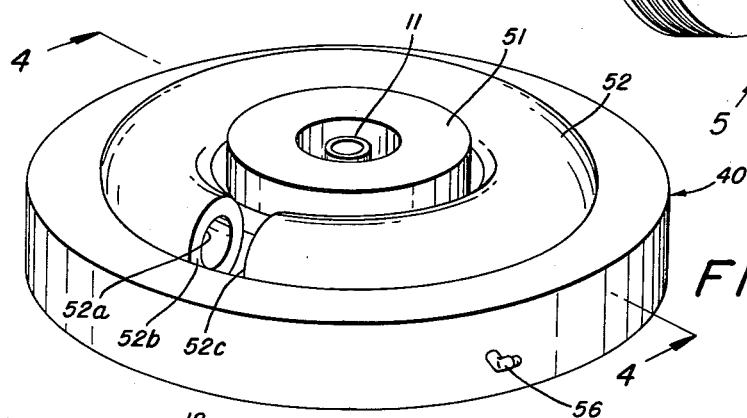
FIG. 3
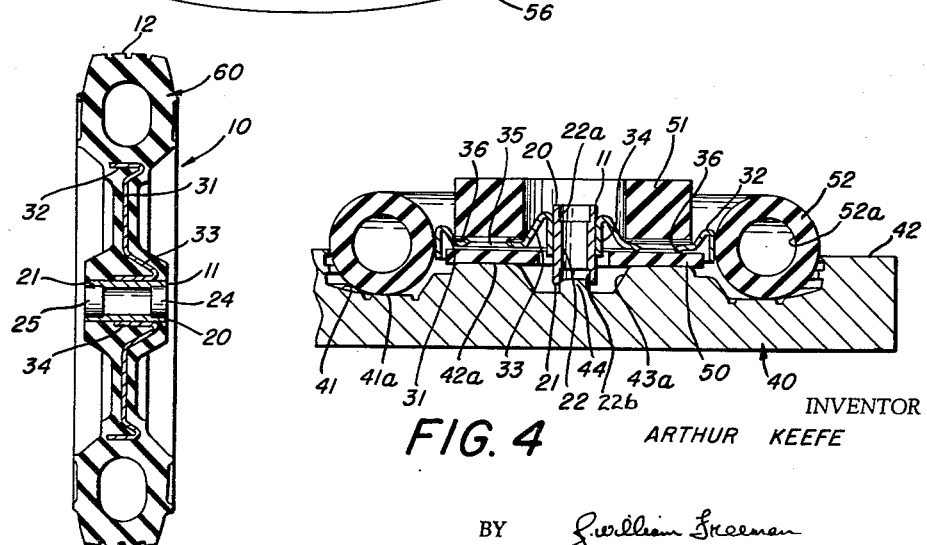
FIG. 4
FIG. 5
INVENTOR
ARTHUR KEEFE
BY J. William Freeman
ATTORNEY

United States Patent Office 3,062,254
Patented Nov. 6, 1962

3,062,254
MOLDED WHEEL HAVING INTERNAL
REINFORCING
Arthur Keefe, 56 Broad St., Akron, Ohio
Filed Oct. 20, 1959, Ser. No. 847,573
4 Claims. (Cl. 152—7)

This invention relates to the art of wheel construction and in particular has reference to an improved type of molded wheel member having embedded therein internal support means, with the support means serving to connect the molded tire portion with the conventional bushing used to mount such wheels on axles.

Molded wheels of the type herein being discussed have long been used in the industry in installations where riding comfort does not dictate or justify the expense of pneumatic tires. Typical installations featuring the use of such molded wheels are wagons, small bicycles, garden carts and golf carts, for example.

In some instances, molded wheels of this type are made semi-pneumatic by extruding the tire portion in tubular form and then joining the severed ends of a predetermined length together to form a tire portion that is receivable over the rim.

In the past the customary procedure employed in connection with the manufacture of such wheels has been to provide a tire of predetermined circumference that may be forced or fitted over the rim portion subsequent to the molding thereof to the desired configuration and shape. The rims so employed normally have flanges that define a seat for the inner radial surface of such molded tires and it is necessary that the diameter of this rim seat be greater, at its opposed axial edges, than the diameter of the internal surfaces of the tire. This is necessary to prevent displacement of the tire from the rim during use and, as a result of such dimensions, it is necessary that the tire body invariably has to be expanded or otherwise forced over the rim diameter to be seated thereon.

While this can be done and has been done in the past, it is believed manifest that tires of this type make no provision against relative movement between tire and rim, with the result that the tire will oftentimes slip on the rim, especially if the diameter thereof is made slightly oversized to facilitate mounting as above described.

It has been discovered that the above disadvantages can be obviated by molding the tire body around what normally would constitute the rim portion so as to, in effect, weld or join the tire body to the rim during molding and thus provide an article having the appearance of a molded article but being internally supported by the concealed rim so as to be enabled to withstand loads during use thereof.

It will also be noted that the molding technique above described has the added advantage of being capable of preventing relative movement between the molded tire and the rim in view of the adhesion between the respective surfaces involved. This anti-rotation property can be enhanced if the rim is voided or apertured so as to be filled with rubber during the curing cycle.

It has also been found that if the bushing normally employed as an axle housing for wheels of this type is made to coact with locating means provided on the mold sections per se, that the rim can be prepositioned between the mold sections so as to be internally encased within the final molded product, with the rim, in effect, becoming a radial web that interconnects and prevents relative movement between the tire body and the bushing that is journaled about the conventional axle.

It accordingly becomes the principal object of this invention to provide a low cost, high production type of molded wheel characterized by the fact that the same is made in one molding operation and includes a preset and prelocated bushing for journaling around the axle and is also provided with a concealed radial web that serves to reinforce the same and add rigidity thereto.

Other objects of the invention will become more apparent upon a reading of the following brief specification, considered and interpreted in the light of the accompanying drawings.

Of the drawings:

FIGURE 1 is a perspective view of the improved molded wheel.

FIGURE 2 is a perspective view partly broken away and in section and showing the reinforcing web employed in connection with the invention.

FIGURE 3 is a perspective view showing the component parts positioned in one mold section prior to curing.

FIGURE 4 is a vertical section taken on the lines 4—4 of FIGURE 3.

FIGURE 5 is a cross-sectional view taken on the lines 5—5 of FIGURE 1.

Referring now to the drawings and in particular to FIGURE 1 thereof, the improved molded wheel, generally designated by the numeral 10, is shown including a central bushing 11 that is designed for reception around an axle so as to permit the tread portion 12 to roll across the ground in normal fashion.

Referring next to FIGURES 4 and 5, it will be first noted that the bushing 11 is of generally cylindrical configuration so as to include opposed axial ends 20 and 21, with the internal wall 22 of the bushing being undercut, as at 22a, 22b, for the dual purpose of locating the bushing 11 and subsequently providing a seat for bearing members 24 and 25 (see FIGURE 5).

The reinforcing web, indicated generally by the numeral 30 in FIGURE 2 of the drawings, is shown as being of generally flat, circular configuration, with the outer peripheral edge 31 thereof being provided with an axially extending return flange 32, while the central region thereof is formed with a return flange 33 that terminates in a cylindrical housing 34 designed to be telescoped over the exterior surface of the bushing 11 as is clearly shown in FIGURES 2, 4 and 5 of the drawings. Preferably in this regard, web 30 will be spot welded or otherwise affixed on the bushing 11 to prevent relative axial or rotational shifting therebetween.

In addition to the aforementioned component parts, the web 30 preferably includes a plurality of apertures 35, 35, at least one of which is provided with a struck portion 36 as shown in FIGURE 4 of the drawings. These struck portions, in effect, created lightening holes and thus reduce the weight of the web, while radially strengthening the same and providing a void in which the rubber can be received during curing. Preferably, the struck portions 36, 36 are alternately projecting from the opposed faces of the web, although this is not mandatory. The web 30 also includes one or more radially extending corrugations 37, 37, with these corrugations 37, 37 forming grooves within which the rubber may be received for anti-rotation purposes. Grooves or corrugations in other directions are included within the scope of this disclosure.

The improved wheel of this invention is manufactured by molding the same between opposed molds, as has been previously indicated.

Accordingly, in FIGURES 3 and 4, one such mold section is shown and it is to be understood that a similar complementally shaped mold section would be employed in connection with the invention.

Accordingly, the mold section 40 shown in FIGURES 3 and 4 includes a design imparting cavity 41 that opens into the parting line surface 42 of the mold section. The design imparting cavity 41 includes a design surface area 41a for the tread portion, a design imparting portion 42a for the radial portion of the tire, and a design imparting portion 43a for forming the hub. A pin 44 projects axially from the center of the surface 43a as shown best in FIGURE 4, with this pin 44 being received in undercut portion 22b for locating the bushing 11 with respect to the just described design imparting areas. It is to be understood that a similar pin (not shown) could be provided on the opposed mold section for coaction with the undercut portion 22a and in this regard, it is believed apparent that the pin members so employed could be formed independently of the mold section or could, if desired, be spring loaded with respect thereto.

In addition to the aforementioned component parts, it is believed manifest that a certain amount of charge will be necessary to fill the void between the design imparting cavities when the mold sections are closed.

To this end, the preferred embodiment of the invention contemplates that the charge be broken down into three separate ingredients, with a circular sheet 50 being applied over one face of web 30, while a second cylindrical sheet 51 is applied over the opposed face thereof as shown in FIGURE 4. An endless circular ring 52 of charge is also provided in encircling relationship to the return flange 32.

In this manner the sub-assembly of bushing and web can be first made up and a predetermined amount of charge in the form of sheets 50 and 51 applied to opposed faces of the web 30. A series of such "sandwiches" can be made up and during production it is only necessary that the sub-assembly of bushing 11, web 30 and sheets 50 and 51 be dropped into position by inserting end 22b of the bushing over pin 44. At this time, the circular charge 52 can be dropped in place followed by closing of the mold section. The various charges 50, 51 and 52 just described will, of course, flow into a unitary mass during closure, with the mass forming the tire body indicated by the numeral 60 in FIGURE 5 of the drawings.

In the preferred embodiment shown, the charge 52 is provided with an internal void 52a and during curing this void can be kept pressurized by insertion of an inflation needle through opening 56 provided in mold 40, as shown in FIGURE 3 of the drawings. Also, it is believed understood that the ends 52b and 52c of the charge 52 can be joined together during positioning.

In use or operation of the improved wheel, the same will be made as has just been indicated by first closing the mold section on the components positioned on mold section 40, as shown in FIGURE 4, followed by curing of the same.

In use of a tire made according to the invention above described, it is believed apparent that the molding operation just described insures centering of the web member between the opposed radial faces of the wheel, with this condition being best shown in FIGURE 5 of the drawings. In this position, the fact that the apertures 36 have been filled by rubber will prevent relative shifting of the tire body 60 relatively of the web 30, while radial deformation of the tire body 60 will be prevented by the return flange 32 provided at the peripheral edge.

It will be seen from the foregoing that there has been provided a new and novel type of molded wheel characterized by the fact that the internal support means provided therein serve the dual function of providing support to the finished tire, while assisting in the molding of the same.

While a full and complete disclosure of the invention has been set forth in accordance with the dictates of the patent statutes, it is to be understood that the invention is not intended to be so limited.

Thus, while the preferred embodiment of the invention has been discussed in connection with non-pneumatic or semi-pneumatic tires, it is to be understood that the principle of the inventive concept herein disclosed could be equally well used in the manufacture of pneumatic tires wherein the tire casing could be formed over the peripheral edge of the flange to cause the flange to be imbedded in the tire casing. Also, while the axial housing members have been shown undercut, it is to be understood that a straight bore bushing could be employed and in such instances bearing inserts could be easily fitted into the bushing to permit the installation of bearings within the constant internal diameter of the bushing.

It is to be noted that the important concept of this invention is the concept of wheel, hub and tire that are molded together in one unit and which are operatively interconnected so that upon removal of the finished product from the mold section, there is produced a unit ready for immediate use.

Accordingly, where appropriate, modifications of the invention may be resorted to without departing from the spirit hereof or the scope of the appended claims.

What is claimed is:

1. A molded wheel member of the character described, comprising: a rigid cylindrical bushing defining axle receiving means; a rigid circular web having an outer return flange and a central return flange; said central return flange telescoping over said bushing intermediate the opposed axial ends thereof; a body portion molded around said web and said bushing and defining the exterior surface of said wheel; and said outer return flange being imbedded in the tire portion of said wheel.

2. A molded wheel member of the character described, comprising: a rigid cylindrical bushing defining axle receiving means; a rigid circular web having an outer return flange and a central return flange; said central return flange telescoping over said bushing intermediate the opposed axial ends thereof; a body portion molded around said web and said bushing and defining the exterior surface of said wheel; said outer return flange being imbedded in the tire portion of said wheel; said web being radially corrugated to form grooves; and said molded body filling said grooves preventing relative axial movement between said body and said web.

3. As an article of manufacture, a molded rubber wheel having a rotation bushing and a body portion molded thereon; a circular web having an outer return flange and a central return flange imbedded in and reinforcing said body portion; said central return flange telescopically engaged intermediate the axial ends of said bushing; and said web extending radially from said bushing with said outer return flange being imbedded in the tire portion of said wheel.

4. The device of claim 3 wherein said web is radially corrugated to form grooves; said body portion filling said grooves preventing relative rotation between said body and said web around the axis of said bushing.

References Cited in the file of this patent
UNITED STATES PATENTS

| | | |
|---|---|---|
| 721,002 | Boulicault | Feb. 17, 1903 |
| 1,386,389 | Wilson et al. | Aug. 2, 1921 |
| 1,457,013 | Wilson | May 29, 1923 |
| 1,580,267 | Nelson | Apr. 13, 1926 |
| 1,682,899 | Fletcher | Sept. 4, 1928 |
| 1,697,438 | Wagenhorst | Jan. 1, 1929 |
| 2,089,986 | Schmidt | Aug. 17, 1937 |